(12) United States Patent
Riggs, Jr.

(10) Patent No.: US 6,200,529 B1
(45) Date of Patent: Mar. 13, 2001

(54) CORROSION INHIBITION METHOD SUITABLE FOR USE IN POTABLE WATER

(75) Inventor: Olen L. Riggs, Jr., Bethany, OK (US)

(73) Assignee: A. S. Incorporated, Alameda, CA (US)

( * ) Notice: Subject to any disclaimer, the term of this patent is extended or adjusted under 35 U.S.C. 154(b) by 0 days.

(21) Appl. No.: 09/360,768

(22) Filed: Jul. 26, 1999

Related U.S. Application Data

(60) Provisional application No. 60/114,551, filed on Dec. 31, 1998.

(51) Int. Cl.⁷ ...................................................... C23F 11/00
(52) U.S. Cl. ............................. 422/14; 210/696; 210/697; 210/701; 210/754; 210/764; 252/389.2; 252/389.21; 252/389.22; 252/389.23; 252/389.24; 422/7; 422/15; 422/18
(58) Field of Search .................................. 422/7, 14, 15, 422/18, 905; 210/696, 697, 701, 754, 764; 252/387, 389.2, 389.21–389.24

(56) References Cited

U.S. PATENT DOCUMENTS

| 4,029,577 | * | 6/1977 | Godlewski et al. | 210/58 |
| 5,202,058 | * | 4/1993 | Riggs | 252/387 |
| 5,376,331 | * | 12/1994 | Buchner et al. | 422/18 |

FOREIGN PATENT DOCUMENTS

| 066 347 | 12/1982 | (EP) . |
| 265 723 | 5/1988 | (EP) . |

* cited by examiner

*Primary Examiner*—Krisanne Thornton
(74) *Attorney, Agent, or Firm*—LeeAnn Gorthey

(57) ABSTRACT

Effective corrosion inhibitors having minimal organic content, particularly suitable for use in municipal drinking water systems, are described. The preferred corrosion inhibiting additive is an aqueous solution of a stannous halide, preferably stannous chloride.

21 Claims, No Drawings

US 6,200,529 B1

CORROSION INHIBITION METHOD SUITABLE FOR USE IN POTABLE WATER

This application claims priority to U.S. provisional application Ser. No. 60/114,551, filed Dec. 31, 1998, which is hereby incorporated by reference.

FIELD OF THE INVENTION

The present invention relates to methods for inhibiting corrosion of corrodible metals present in contact with water in distributive water systems, particularly those associated with distribution of drinking water.

BACKGROUND OF THE INVENTION

In 1992, the United States Environmental Protection Agency adopted a standard for lead and copper in municipal drinking water. The standard sets action levels for lead and copper in standing samples collected from faucets with the highest risk for elevated lead and copper levels. The action level for lead is 15 µg/liter of water; the action level for copper is 1.3 mg/liter of water. The source of these and other metals in drinking water is primarily corrosion of plumbing system components, which include copper and lead-based solder as well as carbon steel and brass. Current anticorrosion additives, which include phosphate salts and/or zinc salts, have been in use for many years, but do not always provide adequate protection. There remains a need for improved corrosion inhibitors which are not themselves likely to present a health hazard when added to water.

Co-owned U.S. Pat. Nos. 5,202,058 and 5,510,057 describe the use of stannous salts, such as stannous octanoate or stannous chloride, typically in combination with other additives, in an alcoholic solvent medium, for reducing metal corrosion in, for example, cooling water tower systems. However, these additional components, including the alcoholic solvent, would be undesirable or even prohibited for use in drinking water supplies. Alcoholic solvents can provide a food source for the growth of bacteria and thus impact the sterility of drinking water supplies. Reduction in microbial growth would be beneficial in industrial water supplies as well. Accordingly, there is a need for effective corrosion inhibitors which minimize organic content.

SUMMARY OF THE INVENTION

The present invention includes, in one aspect, a method for inhibiting corrosion of corrodible metal in contact with water in a distributive water system. According to the method, stannous halide alone, a composition consisting essentially of stannous halide, or a composition consisting essentially of an aqueous stannous halide solution, is added to the water, and a concentration of the stannous halide corresponding to a tin level of about 0.01 to about 75 ppm is maintained in the water system.

The halide is preferably selected from stannous fluoride, stannous chloride, and stannous bromide, and is most preferably stannous chloride. The stannous halide is preferably added in the form of an aqueous solution. The weight percent of stannous chloride in an aqueous stannous chloride solution is preferably about 5 to 90 percent, and more preferably about 40 to 80 percent. The concentration of stannous chloride corresponding to a tin level of about 0.01 to about 75 ppm is about 0.016 ppm to about 120 ppm $SnCl_2$; a preferred concentration range for stannous chloride in the water system is about 0.05 to 25 ppm $SnCl_2$.

The corrodible metal is typically a ferrous metal, a brass metal, a copper-containing metal, or a lead-containing metal. In a preferred embodiment of the method, the distributive water system is a municipal drinking water system. Such a system may initially contain an alkali metal phosphate, such as a pyrophosphate, an orthophosphate, a hexametaphosphate, a hypophosphate, a polyphosphate, or a combination thereof, typically in an amount effective to provide a concentration of about 0.01 ppm to about 5 ppm of the alkali metal phosphate in the water system. The water system may also be treated to contain at least one component selected from a dispersing agent, a chelating agent, and a biocide In another aspect, the invention provides a related method for inhibiting corrosion of corrodible metal in contact with water in a distributive water system. In this method, stannous halide alone, a composition consisting essentially of stannous halide, or a composition consisting essentially of an aqueous stannous halide solution, is added to the water system, in combination with an alkali metal phosphate selected from a pyrophosphate, an orthophosphate, a hexametaphosphate, a hypophosphate, and a polyphosphate. A concentration of the stannous halide corresponding to a tin level of about 0.01 to about 75 ppm is maintained in the water system. Again, stannous chloride is the preferred halide, and is preferably maintained at a level of about 0.05 ppm to about 25 ppm in the water system. The alkali metal phosphate, e.g. sodium hexametaphosphate or sodium orthophosphate, is typically present in an amount effective to provide a concentration of about 0.01 ppm to about 5 ppm in the water system.

In a further aspect, the invention provides a metal corrosion inhibiting composition, consisting essentially of (i) stannous halide or a an aqueous stannous halide solution and (ii) an alkali metal phosphate selected from a pyrophosphate, an orthophosphate, a hexametaphosphate, a hypophosphate, and a polyphosphate. In preferred embodiments, the stannous halide is stannous chloride, and the stannous chloride and alkali metal phosphate are present in relative amounts effective to produce concentrations of about 0.05 ppm to about 25 ppm and about 0.01 ppm to about 5 ppm, respectively, in a distributive water system. The composition may also include one or more substances typically added to a distributive water stream for purposes other than inhibition of corrosion, such as a dispersing agent, chelating agent, or biocide. In one embodiment, the composition includes an acrylate copolymer, e.g. an acrylate/sulfonate copolymer.

These and other objects and features of the invention will become more fully apparent when the following detailed description of the invention is read in conjunction with the accompanying drawings.

DETAILED DESCRIPTION OF THE INVENTION

I. Definitions

"Corrosion" of a metal in contact with water, as used herein, refers to degradation of the metal due to chemical reaction with its environment, in this case, water and substances present in the water, including air. Such corrosion ultimately leads to dissolution or dispersion of the metal or metal compound in the water, observed as a loss of mass of the metal.

As used herein, "aqueous stannous halide" or "an aqueous stannous halide solution" refers to a composition of stannous halide dissolved in water, typically in fairly high concentration, i.e., about 30 weight percent or greater. The water may be treated with acid, e.g. HCl, to promote dissolution of the stannous halide. There are no other components in any appreciable concentration.

A "composition consisting essentially of" stannous halide (or an aqueous stannous halide solution) refers to stannous halide (or an aqueous stannous halide solution) in combination with one or more optional components which do not materially affect the metal corrosion inhibiting characteristic(s) of the composition. Such components would typically be substances added to a distributive water stream for purposes other than inhibition of corrosion, as defined above. For example, dispersing or chelating agents, such as soluble anionic polymers (e.g. polyacrylates or acrylate copolymers), may be employed to reduce scale formation on solid surfaces; biocides may be added to reduce microbial growth.

A similar definition applies to compositions consisting essentially of stannous halide (or an aqueous stannous halide solution) and an alkali metal phosphate. Such compositions may also include components present for purposes other than inhibition of corrosion.

The "halide" in the above definitions is selected from fluoride, chloride, bromide, or iodide; the halide is preferably fluoride, chloride, or bromide, and is most preferably chloride.

A "concentration of stannous halide which corresponds to a concentration of tin" in a given concentration range is determined from the relative molecular weights of the components, for example:

| 0.010 ppm tin corresponds to approx. | 0.013 ppm $SnF_2$, | 0.016 ppm $SnCl_2$, or | 0.023 ppm $SnBr_2$; |
|---|---|---|---|
| 0.150 " | 0.20 " | 0.24 " | 0.35 " |
| 1.0 " | 1.32 " | 1.60 " | 2.34 " |
| 10 " | 13.2 " | 16.0 " | 23.4 " |
| 75 " | 99 " | .120 " | 176 " |

In the appended claims, water contained in a distributive water system to which a corrosion inhibitor is added is referred to as the "water system", rather than simply "water", to avoid confusion with the concentrated aqueous stannous halide solutions.

II. Preparation of Aqueous Stannous Chloride Solutions and Use in Corrosion Inhibition To form the minimal organic content corrosion inhibitors of the invention, any stannous halide, or preferably a concentrated aqueous solution of the stannous halide, may be used. Because stannous iodide has a relatively low aqueous solubility, stannous fluoride, bromide, and chloride are preferred. For reasons of solubility and stability, stannous chloride is particularly preferred.

Highly concentrated aqueous stannous chloride solutions, i.e. up to 90 weight percent $SnCl_2$, may be conveniently prepared by adding water to stannous chloride in the desired weight ratio and stirring for a brief period of time. Alternatively, stannous chloride may be added to water. Dissolution is enhanced by using water which is slightly acidic. Such a solution may then be added to a distributive water system in an amount needed to produce a desired concentration of $SnCl_2$, e.g. about 0.05 ppm to about 25 ppm (about 0.03 to 16 ppm tin), in the water system. The concentration of $SnCl_2$ in the water system may then be monitored, by techniques known in the art, and adjusted as necessary to maintain the desired concentration.

Stannous chloride may also be added alone, as a solid, rather than in the form of an aqueous solution. However, for ease and consistency of addition, an aqueous solution is preferred.

Aqueous stannous chloride solutions containing 50 weight percent $SnCl_2$ were prepared by adding the solid to water, in the manner described above. In the following experiments, samples of these solutions were added to samples of municipal drinking water effective to provide final concentrations of 0.15 to 1.0 ppm stannous chloride in the water, as shown.

To produce the data shown in Table 1, samples of the metals shown were immersed in samples of municipal drinking water, containing about 3 ppm of the conventional corrosion inhibitor sodium hexametaphosphate (HMP), from a system located in the upper midwestern region of the U.S. The test was carried out according to the procedure described in Materials and Methods, below. Corrosion rates, expressed in mils per year, were determined after 7 days at 120° F. in aerated water samples with and without 0.25 ppm added $SnCl_2$. As shown in the Table, significant decreases in corrosion were observed in the $SnCl_2$-treated samples, especially with respect to carbon steel, copper and lead corrosion.

TABLE 1

| Metal | No added $SnCl_2$ Rate, MPY | 0.25 ppm $SnCl_2$ Rate, MPY |
|---|---|---|
| Carbon Steel | 40.2 | 2.1 |
| Brass (CDA-443) | 0.43 | 0.15 |
| Copper | 0.71 | 0.00 |
| Lead | 1.80 | 0.09 |

To obtain the data shown in Table 2, a specimen of each metal was suspended in a sample of municipal drinking water from Oklahoma (designated OKC) in a one-liter flask equipped with a condenser, gas delivery inlet, and thermometer. The contents of each flask were heated to 120° F. under a continuous air flow (1.5 cu ft/min) for seven days. Corrosion rates are again expressed as mils per year; nd=not determined. Various concentrations of $SnCl_2$ were used, as shown. As the data show, very low concentrations of $SnCl_2$ were effective in reducing corrosion.

TABLE 2

| Metal | No added $SnCl_2$* Rate, MPY | Treated ($SnCl_2$) Rates, MPY | | | |
|---|---|---|---|---|---|
| | | 0.15 ppm | 0.25 ppm | 0.50 ppm | 1.0 ppm |
| Lead | 1.2 | nd | 0.13 | 0.06 | 0.00 |
| CDA-443 Brass | 0.43 | 0.23 | nd | 0.02 | nd |
| CDA-120 Copper | 0.71 | nd | 0.00 | nd | nd |

*The water contains about 3 ppm sodium hexametaphosphate, as discussed below.

II. Corrosion Inhibition by Stannous Chloride in the Presence of Phosphate Additives Currently, municipal water supplies frequently contain, as corrosion inhibiting additives, phosphates and/or zinc salts. For example, samples of OKC drinking water used in the experiments described herein contain, unless otherwise indicated, 3 ppm sodium hexametaphosphate. Therefore, experiments were carried out to examine the comparative and additive effects of aqueous stannous chloride and the phosphate additives already in use.

Table 3 shows corrosion rates in MPY for various metals in OKC water (aerated at 120° F., as described for Table 2) containing 3 ppm hexametaphosphate (as received) with and without other additives. The results show that increasing the amount of phosphate had variable results, depending on the metal tested; in some cases corrosion increased (e.g. for lead). Addition of zinc chloride gave moderate improvements, except in the case of lead. Addition of stannous chloride, however, reduced corrosion significantly, as is most apparent from a comparison of the $3^{rd}$ and $5^{th}$ data columns.

TABLE 3

| Metal | Additive[a] | | | | | |
|---|---|---|---|---|---|---|
| | 3 ppm HMP (as received) | 3 ppm HMP 3 ppm OP | 6 ppm HMP | 3 ppm HMP 3 ppm OP 0.5 ppm $SnCl_2$ | 6 ppm HMP 0.5 ppm $SnCl_2$ | 6 ppm HMP 0.1 ppm $Zn^{+2}$ |
| 1018 Carbon Steel | 41.3 | 25.7 | 29.5 | 18.6 | 11.4 | 24.3 |
| CDA-443 Brass | 0.49 | 0.28 | 1.40 | 0.19 | 0.02 | 0.98 |
| CDA-120 Copper | 0.72 | 0.28 | 0.90 | 0.00 | 0.00 | 0.28 |
| Lead | 1.21 | 2.19 | 1.10 | 0.90 | 0.00 | 1.13 |

[a]OP = sodium orthophosphate; HMP = sodium hexametaphosphate

Table 4 gives further data for carbon steel corrosion (aerated at 120° F., as described above), showing combinations of $SnCl_2$ with varying amounts of phosphate. As shown in the Table, addition of $SnCl_2$ reduced corrosion in all cases, although it appeared to be more effective at lower levels (3 ppm vs. 6 ppm) of phosphate.

TABLE 4

(Carbon Steel)

| ppm HMP | ppm $SnCl_2$ | Corrosion, MPY |
|---|---|---|
| 3 (as received) | 0 | 41.3 |
| 3 | 0.25 | 6.8 |
| 3 | 0.50 | 7.6 |
| 6 (3 ppm added) | 0 | 29.5 |
| 6 | 0.25 | 13.3 |
| 6 | 0.50 | 11.4 |
| 3 (as received, plus 3 ppm OP added) | 0.25 | 11.1 |

To produce the data in Table 5, a sample of OKC water was obtained which had been filtered and disinfected but not treated with phosphate. Corrosion rates were determined for carbon steel in heated, aerated water as described above.

TABLE 5

(Carbon Steel)

| ppm HMP | ppm $SnCl_2$ | Corrosion, MPY |
|---|---|---|
| 0 | 0 | 49.3 |
| 3 | 0 | 21.1 |
| 3 | 0.25 | 13.3 |
| 0 | 0.25 | 2.1 |

III. Copper Corrosion Inhibition by $SnCl_2$ in the Presence of a Polymeric Dispersant or Metal Chelator As noted above, the present anticorrosive stannous halide compositions may be used in combination with components which do not materially affect the metal corrosion inhibiting characteristic(s) of the composition. Such components would typically be substances added to a distributive water stream for purposes other than inhibition of corrosion. For example, dispersing or chelating agents, such as soluble anionic polymers (e.g. polyacrylates or acrylate copolymers), may be employed to reduce scale formation on solid surfaces. One such polymer, ACUMER® 2100 (Rohm & Haas), an acrylate/sulfonate copolymer, was added to test systems such as described above. In these tests, the metal coupons were copper (CDA-110), and the water was municipal drinking water from LaSalle, Ill., which contained no phosphate additives. Test conditions were as described in Materials and Methods, below (120° F., aerated water, 7 days duration).

As shown below, the copolymer had no adverse properties on the corrosion inhibiting properties of $SnCl_2$. Although larger concentrations of the copolymer alone appeared to increase corrosion, this effect was very effectively counteracted by the presence of $SnCl_2$.

Also shown in Table 6 is a combination of $SnCl_2$ with AMP (aminotris(methylenephosphonic acid); MAYOQUEST® 1320), which is useful in scale control by sequestering calcium and magnesium as well as ferrous ion. Again, the metal coupon showed very low corrosion in the presence of this additive and low concentrations of $SnCl_2$.

TABLE 6

(Copper)

| Additive | $SnCl_2$, ppm | Corrosion Rate, MPY |
|---|---|---|
| ACUMER ® 2100, 0.25 ppm | 0 | 1.80 |
| ACUMER ® 2100, 0.25 ppm | 0.25 | 0.0 |
| ACUMER ® 2100, 3 ppm | 0 | 29.3 |
| ACUMER ® 2100, 3 ppm | 0.50 | 0.0 |
| AMP, 0.25 ppm | 0 | 1.80 |
| AMP, 0.25 ppm | 0.25 | 0.08 |

IV. Lead Corrosion Inhibition at Varying pH

A series of tests was run to determine the effectiveness of conventional corrosion inhibitors and $SnCl_2$ on lead coupons at varying pH. Drinking water from Fall River, Mass., having no phosphate additives as received, was used for the tests, using the methods described above. pH was determined using EM Reagents COLORPHAST® indicator strips.

TABLE 7

(Lead)

| pH | Treatment | Corrosion Rate, MPY |
|---|---|---|
| 5.3 | None | 0.64 |
| 5.3[a] | 3 ppm OP | 3.43 |
| 5.3 | 3 ppm HMP | 4.60 |
| 7.2 | None | 2.00 |
| 7.2 | 3 ppm OP | 3.39 |
| 7.2 | 3 ppm HMP | 2.10 |
| 7.2 | 0.25 ppm $SnCl_2$ | 0.03 |

[a]pH prior to test; analysis after testing gave a reading of 6.9.

As shown in Table 7, corrosion was greater in untreated water at higher pH, which may be partially due to the somewhat higher solubility of lead oxide under these conditions. Both sodium orthophosphate (OP) and sodium hexametaphosphate (HMP) increased the corrosion, particularly under acidic conditions, producing a reddish-yellow corrosion product (lead oxides) on the metal. However, corrosion was minimal in the sample containing 0.25 ppm $SnCl_2$.

The above results show that aqueous stannous chloride is an extremely effective corrosion inhibitor both as a sole additive and in the presence of other substances commonly employed in municipal drinking water supplies, such as alkali metal phosphates, dispersants and metal chelators. Therefore, stannous chloride may be added to systems containing such additives, or it may be added concurrently with the additives. Although the data from the experiments above suggest that aqueous stannous chloride is in fact more effective when used without phosphates, the data also demonstrate that its addition to existing water supplies containing phosphates provides significant benefits over phosphates alone.

While the invention has been described with reference to specific methods and embodiments, it will be appreciated that various modifications may be made without departing from the invention.

MATERIALS & METHODS

A typical corrosion test was carried out in the following manner. The test sample of municipal drinking water was placed in a one liter resin kettle equipped to hold (1) a jacketed water cooled condenser, (2) a mounted air-injection gas tube, and (3) a holder from which the test specimen was suspended and totally immersed in the test water. The complete assembly was placed in a constant temperature oil bath. The test water was agitated by compressed air at a flow rate of 1.5 $ft^3$/min. The temperature was maintained at 120° F. for seven days.

Test coupons were generally 1"×2"×1/16" in size, with a 1/4" mounting hold centered 1/4" from one end. The test coupons were weighed before and after testing, and weight loss in milligrams was converted to a corrosion rate of milliinches per year (mpy).

It is claimed:

1. A method for inhibiting corrosion of corrodible metal in contact with water in a distributive water system, comprising
   (a) adding to said water system, a composition consisting essentially of an aqueous stannous halide solution,
   and (b) maintaining in said water system a concentration of said stannous halide which corresponds to a concentration of tin between about 0.01 ppm and about 75 ppm.

2. The method of claim 1, wherein said stannous halide is selected from the group consisting of stannous fluoride, stannous chloride, and stannous bromide.

3. The method of claim 2, wherein said stannous halide is stannous chloride, and the concentration of stannous chloride in the water system is maintained at about 0.015 ppm to about 120 ppm.

4. The method of claim 3, wherein the concentration of stannous chloride in the water system is maintained at about 0.05 ppm to about 25 ppm.

5. The method of claim 3, wherein the weight percent of stannous chloride in said aqueous stannous chloride solution is from about 5 to 90 percent, and said solution is formed by adding water to stannous chloride in the desired weight ratio.

6. The method of claim 5, wherein said weight percent is from about 40 to 80 percent.

7. The method of claim 1, wherein said corrodible metal is selected from the group consisting of a ferrous metal, a brass metal, a copper-containing metal, and a lead-containing metal.

8. The method of claim 1, wherein said distributive water system is a municipal drinking water system.

9. The method of claim 1, wherein said water system contains an alkali metal phosphate selected from a pyrophosphate, an orthophosphate, a hexametaphosphate, a hypophosphate, and a polyphosphate.

10. The method of claim 9, wherein said alkali metal phosphate is present in an amount effective to provide a concentration of about 0.01 ppm to about 5 ppm in said water system.

11. The method of claim 1, wherein said water system is treated to contain at least one component selected from a dispersing agent, a chelating agent, and a biocide.

12. A method for inhibiting corrosion of corrodible metal in contact with water in a distributive water system, comprising
   a) adding to said water system, a composition consisting essentially of (i) an aqueous stannous halide solution and (ii) an alkali metal phosphate selected from a pyrophosphate, an orthophosphate, a hexametaphosphate, a hypophosphate, and a polyphosphate, and (b) maintaining in said water system a concentration of said stannous halide which corresponds to a concentration of tin between about 0.01 ppm and about 75 ppm.

13. The method of claim 12, wherein said stannous halide is selected from the group consisting of stannous fluoride, stannous chloride, and stannous bromide.

14. The method of claim 13, wherein said stannous halide is stannous chloride, and the concentration of stannous chloride in the water system is maintained at about 0.015 ppm to about 120 ppm.

15. The method of claim 14, wherein said concentration of stannous chloride is maintained at about 0.05 ppm to about 25 ppm.

16. The method of claim 13, where in step (i) stannous chloride is added in the form of an aqueous stannous chloride solution.

17. The method of claim 12, wherein said alkali metal phosphate is added in an amount effective to provide a concentration of about 0.01 ppm to about 5 ppm in said water system.

18. The method of claim 12, wherein said alkali metal phosphate is sodium hexametaphosphate or sodium orthophosphate.

19. A metal corrosion inhibiting composition consisting essentially of (I) an aqueous stannous chloride solution and (ii) an alkali metal phosphate selected from a group consisting of pyrophosphate, an orthophosphate, a hexametaphosphate, a hypophosphate, and a polyphosphate; wherein the weight percent of stannous chloride is from about 5 to 90 percent, and said stannous chloride and said alkali metal phosphate are present in relative amounts effective to produce final concentrations of about 0.05 ppm to about 25 ppm and about 0.01 ppm to about 5 ppm, respectively, when a sample of the composition is added to a distributive water system.

20. The composition of claim 19, further comprising at least one component selected from a dispersing agent, a chelating agent, and a biocide.

21. The composition of claim 20, wherein said component is an acrylate copolymer.

* * * * *